UNITED STATES PATENT OFFICE 2,028,104

INTERMEDIATES AND DYESTUFFS OF THE ANTHRAQUINONE SERIES

Donald P. Graham, South Milwaukee, Wis., assignor to E. I. du Pont de Nemours & Company, Wilmington, Del., a corporation of Delaware No Drawing. Application October 28, 1933, Serial No. 695,664

9 Claims. (Cl. 260—44)

This invention relates to the preparation of new dyestuffs and intermediates of the anthraquinone-thiazol series, and more particularly to the preparation of 1-amino-anthraquinone-5,6-phenyl-thiazols of the following formula:

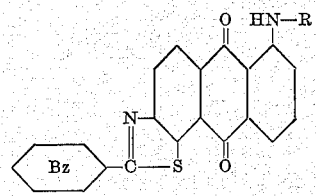

in which R may be hydrogen, any aroyl group of the benzene, naphthalene or anthraquinone series, or a substituted or unsubstituted anthraquinone radical, which latter compounds, commonly termed anthrimides, may be ringclosed by known methods to form what are generally believed to be compounds containing the carbazole nucleus, and in which the Bz ring may be further substituted.

I have found that new and valuable dyestuffs may be obtained when 1-benzoylamino-6-amino-anthraquinone or other similarly reacting 1-acidylamino-6-amino-anthraquinone is reacted with benzotrichloride and sulfur or with other thiazolizing reagents to convert it to the 1-acidyl-amino-anthraquinone-5,6-thiazol, which may then be hydrolyzed to give the new intermediate, 1-amino-anthraquinone-5,6-thiazol. This primary amino body may then be condensed with alkyl or aryl acid chlorides or chlor compounds of the anthraquinone series to give a series of 1-aroylamino-anthraquinone-5,6-thiazole and 1-arylamino-anthraquinone-thiazols, and the latter class may be converted into other dyestuffs by treating them with acid condensing agents in the known manner.

The following examples are given to more fully illustrate my invention, although it is to be understood that they are not to be construed in any manner as limitations thereupon. The parts used are by weight.

Example 1

1 part of 1-benzoylamino-6-amino-anthraquinone, 3 parts of naphthalene, 0.6 parts of benzotrichloride and 0.1 part of sulphur are heated together at 220° C. for five to ten hours, cooled to 170° C., diluted with 8 parts of ortho-dichlorobenzol, cooled to 50° C. and filtered. The cake is washed with alcohol and dried. The product, believed to have the structure of 1-benzoylamino-anthraquinone-5,6-phenyl-thiazol, is a yellow powder giving a yellow solution in sulphuric acid and dyeing cotton in bright yellow shades from a violet vat. 1 part of this product is dissolved in 10 parts of sulphuric acid (80 to 100% $H_2SO_4$) and heated to 80–100°, drowned in 100 parts of water, neutralized with sodium hydroxide, filtered, washed with hot water and dried. The product, 1-amino-anthraquinone-5,6-phenyl-thiazol, is a brownish red powder giving a yellow solution in sulphuric acid.

Example 2

1 part of 1-amino-anthraquinone-5,6-phenyl-thiazol, 0.8 parts of anthraquinone-2-carbonyl chloride, and 10 parts of nitrobenzene are heated to a temperature of 175° C., held ½ hour at 170–180° C., cooled to 50° C., filtered, washed with alcohol, and dried. The product is a yellow powder giving a yellow solution in sulphuric acid and dyeing cotton in yellow shades from a red violet vat.

Example 3

1 part of 1-amino-anthraquinone-5,6-phenyl-thiazol, 1 part of anthraisothiazol-2-carbonyl-chloride and 20 parts of nitrobenzene are heated together to 160° C., and held at 155–170° C. for 10 minutes. The charge is then cooled to 50° C., filtered, washed with alcohol and dried. The product is a yellow vat dyestuff giving a yellow solution in sulphuric acid and a violet vat.

Example 4

1 part of 1-amino-anthraquinone-5,6-phenyl-thiazol, 1 part of 1-nitro-anthraquinone-6-carbonyl-chloride and 15 parts of nitrobenzene are heated together to 180° C., held for ½ hour, cooled, filtered, washed and the resulting nitro body reduced by vatting in 100 parts of water with ½ part of sodium hydroxide and 1 part of sodium hydrosulphite. The vat is oxidized with ½ part of sitol, air, or any suitable oxidizing agent, to the free amine, which is filtered, washed, and dried. This amine is then benzoylated in 10–30 parts of nitrobenzene with 0.3 parts of benzoyl chloride. The benzoylated product is isolated by cooling, filtration, washing and drying. It is a yellow vat dyestuff giving a yellow solution in sulphuric acid and a red violet vat.

Other acid chlorides or acid anhydrides, such as, for example, acetic anhydride, naphthoyl chloride, benzoic anhydride, etc., may be used in place of the particular acid chlorides above mentioned.

Example 5

1 part of 1-amino-anthraquinone-5,6-phenyl-thiazol, 1 part of 1-benzoylamino-5-chlor-anthraquinone, 0.1 part of copper acetate, 1 part of soda ash, 0.01 part of copper powder and 15 parts of nitrobenzene are heated together at 205–215° C. for about 1 hour, cooled, filtered, washed and dried. This product, an anthrimide, is a red powder giving an olive solution in sulphuric acid. It is converted to a dyestuff by closing the carbazole ring in 15 to 50 parts 90–100% sulphuric acid at a temperature not exceeding 35° C. This product is a yellow vat dyestuff giving a brown solution in sulphuric acid and a red violet vat.

A yellow of a browner shade is obtained when 1-benzoylamino-4-chlor-anthraquinone is substituted in the above synthesis for 1-benzoylamino-5-chlor-anthraquinone. The product is similar to the above in color of sulphuric acid solution and appearance of the vat.

Other substituted anthraquinones bearing clorine in the alpha position may be substituted for the benzoylamino-chloro-anthraquinone of these examples.

In the preparation of the anthraquinone-thiazol, other compounds containing the CCl₃ group may be used in place of benzotrichloride to give Bz substituted thiazols, and any of the methods for preparing thiazols from beta-amino-anthraquinones known in the prior art may be substituted for the particular method above described.

While in the specific examples only 1-benzoylamino-6-amino-anthraquinone is used as the starting material for the preparation of the thiazol, other 1-acidylamino-6-amino-anthraquinones, for example, those described in my application Ser. No. 695,663, filed of even date herewith, which has eventuated into U. S. Patent 1,996,959, which will not hydrolyze during the thiazolation step, may be used with varying degrees of success.

Solvents such as dichloro- and trichloro-benzene may be used in place of nitrobenzene in the acid chloride condensation and the temperature at which the condensations are effected may vary within wide limits.

The ring closure of the anthrimides formed by condensation of the 1-amino-anthraquinone-thiazol with chloro-anthraquinone may be effected with acid condensing agents, such as aluminum chloride or sulfuric acid, according to known procedure.

What I claim is:

1. Compounds of the general formula

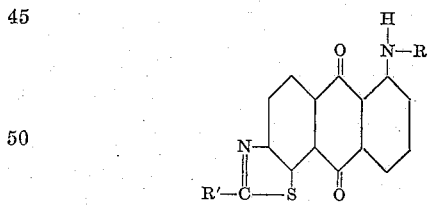

in which R may be hydrogen, an aroyl group of the benzene, naphthalene or anthraquinone series, or an anthraquinone radical, and in which R' is a radical of the benzene series.

2. Compounds of the following general formula:

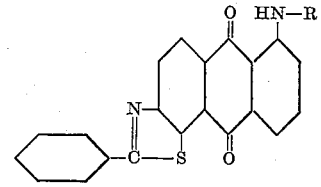

in which R may be hydrogen or an aroyl group of the benzene, naphthalene or anthraquinone series.

3. 1-benzoylamino-anthraquinone-5,6-phenyl-thiazol, which is a yellow powder giving a yellow solution in sulfuric acid, and dyeing cotton in bright yellow shades from a violet vat.

4. 1-amino-anthraquinone-5,6-phenyl-thiazol which is a brownish-red powder giving a yellow solution in sulfuric acid.

5. In the process for preparing 1-amino-anthraquinone-5,6-phenyl-thiazol, the steps which comprise reacting 1-benzoylamino-6-amino-anthraquinone with benzotrichloride and sulfur, and hydrolyzing the compound so produced.

6. In the process for preparing 1-benzoylamino-anthraquinone-5,6-phenyl-thiazol, the step which comprises reacting 1-benzoylamino-6-amino-anthraquinone with benzotrichloride and sulfur.

7. In the process for producing dyestuffs of the anthraquinone-phenyl-thiazol series, the steps which comprise reacting 1-amino-anthraquinone-5,6-phenyl-thiazol with a chloro-anthraquinone compound to produce the corresponding dianthrimide-phenyl-thiazol.

8. In the process for producing dyestuffs of the anthraquinone-phenyl-thiazol series, the steps which comprise reacting 1-amino-anthraquinone-5,6-phenyl-thiazol with a chloro-anthraquinone compound to produce the corresponding dianthrimide-phenyl-thiazol and ringclosing the anthrimide to the carbazol.

9. In the process for producing dyestuffs of the anthraquinone-phenyl-thiazol series, the steps which comprise reacting 1-benzoylamino-6-amino-anthraquinone with benzoyl trichloride and sulfur, hydrolyzing the compound so produced, condensing the 1 - amino - anthraquinone - 5,6-phenyl-thiazol thus obtained with a chloro-anthraquinone compound to produce the corresponding dianthrimide-phenyl-thiazol and ring-closing the anthrimide by means of an acid condensing agent.

DONALD P. GRAHAM.